Figure 1:
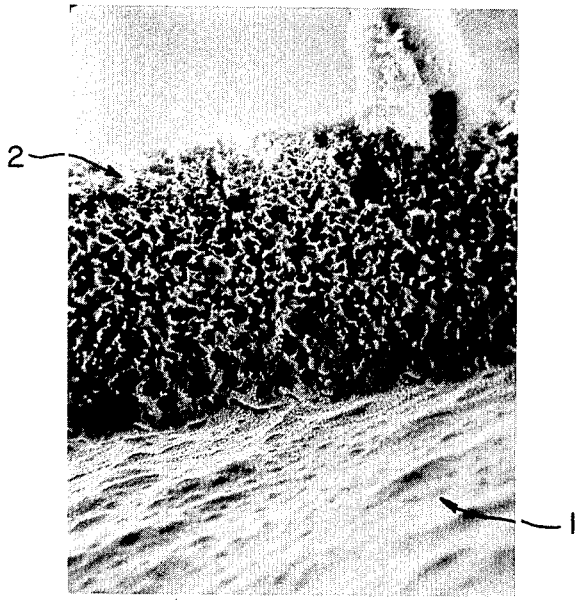

United States Patent [19]

Wrasidlo

[11] Patent Number: 4,900,443

[45] Date of Patent: * Feb. 13, 1990

[54] POROUS ARAMID MEMBRANES AND EMULSIONS USEFUL FOR THE CASTING THEREOF

[75] Inventor: Wolfgang J. Wrasidlo, LaJolla, Calif.

[73] Assignee: Memtec North America Corporation

[ * ] Notice: The portion of the term of this patent subsequent to Dec. 16, 2003 has been disclaimed.

[21] Appl. No.: 46,387

[22] Filed: May 6, 1987

Related U.S. Application Data

[60] Continuation-in-part of Ser. No. 932,372, Nov. 19, 1986, Pat. No. 4,774,039, which is a division of Ser. No. 291,927, Aug. 11, 1981, Pat. No. 4,629,563, which is a continuation-in-part of Ser. No. 130,566, Mar. 14, 1980, abandoned.

[51] Int. Cl.$^4$ .................. B01D 13/00; B01D 13/04
[52] U.S. Cl. ........................... 210/490; 210/500.38; 264/49; 264/204; 264/344
[58] Field of Search .................. 264/49, 204, 344; 427/244, 245, 246; 210/490, 506, 500.38, 492; 528/368

[56] References Cited

U.S. PATENT DOCUMENTS

| | | | |
|---|---|---|---|
| 3,567,632 | 3/1971 | Richter et al. | 210/500.28 |
| 3,615,024 | 10/1971 | Michaels | 210/500.4 |
| 4,340,479 | 7/1982 | Pall | 210/500.33 |
| 4,567,009 | 1/1986 | Badenhop et al. | 264/41 |
| 4,627,992 | 12/1986 | Badenhop et al. | 210/500.38 |
| 4,629,563 | 12/1986 | Wrasidlo | 210/500.38 |
| 4,774,039 | 9/1988 | Wrasidlo | 210/500.41 |

FOREIGN PATENT DOCUMENTS 0036315  9/1981  European Pat. Off. .
3342823  6/1985  Fed. Rep. of Germany .
57-159509 10/1982 Japan .

Primary Examiner—W. Gary Jones
Attorney, Agent, or Firm—Waldron & Associates

[57] ABSTRACT

Fully aromatic polyamide (aramid) resins can be cast into ultraporous and microporous membranes by forming a solution of the resin in an amount sufficient to cast a coherent membrane, diluting the solution with a liquid pore modifier which is a nonsolvent for the resin so as to produce a metastable dispersion of the resin, adding a precipitant to form a turbid casting dope, casting the dope onto a surface, and gelling the so-cast film.

8 Claims, 1 Drawing Sheet

POROUS ARAMID MEMBRANES AND EMULSIONS USEFUL FOR THE CASTING THEREOF

This application is a continuation-in-part of applicant's copending application Ser. No. 932,372, filed Nov. 19, 1986, now U.S. Pat. No. 4,774,039, which is a Divisional of Ser. No. 291,927, filed Aug. 11, 1981, now U.S. Pat. No. 4,629,563, which is a continuation-in-part Ser. No. 130,566, filed Mar. 14, 1980, now abandoned.

TECHNICAL FIELD

This invention relates to the production of fully aromatic (aramid) polyamides in the form of porous membranes and is more particularly related to a dope or casting emulsion utilized in the wet process casting of porous, asymmetric membranes from such aramid polymers.

BACKGROUND ART

Fully aromatic polyamides are known to possess properties such as superior tear strength, bulk modulus, thermal resistance, moisture resistance, and chemical stability, which make them one of the most versatile and highly desirable classes of polymers for membrane filtration. It is, however, difficult to prepare membrane casting dopes from such polymers, since they are essentially insoluble in most common organic solvents and only moderately soluble in certain amide solvents (e.g., dimethylformamide and dimethylacetamide), when employed in conjunction with inorganic solubilizing agents. Nevertheless, integrally skinned, hyperfiltration membranes have been produced from aromatic polyamides, as shown in Richter et al., U.S. Pat. No. 3,567,632. Although the desirability of producing porous membranes composed of aramid resins was recognized, the production of such membranes had generally been limited to what the art refers to as "hyperfiltration" membranes, i.e., those which are essentially nonporous and/or have molecular weight cut-offs of less than 300. Recently, however, processes have been disclosed for the production of more open membranes from aromatic polyamides. Japanese Laid-Open Application No. 57-159509 discloses a process for producing membranes with enhanced permeability (i.e., what appears to be ultrafiltration-type membranes) by the addition of an organic swelling agent to a "conventional" polyamide solution, in which the polyamide resin has been solubilized in an aprotic, amide solvent and an inorganic solubilizing agent. U.S. Pat. No. 4,567,009 discloses a process for producing truly porous microfiltration membranes. The process disclosed therein is, however, limited to the casting of such membranes by what is termed the "dry" process of phase-inversion casting. In phase-inversion casting, the casting dope is spread in a film over a smooth surface and the solvent is initially evaporated from the film. In the "wet" process, the film or nascent membrane is then passed through a quenching solution, e.g., water, to extract the water miscible components from the membrane. In the "dry" process, both the solvent and non-solvent components of the film are essentially removed by evaporation in a humidity-controlled atmosphere. The advantage of the "dry" process, partly because of the slow evaporation, is that it provides a good degree of control of pore size—thereby permitting the casting of a membrane with a high degree of openness. The disadvantages are that it is not generally suitable for: (i) large-scale production because of its dependence on the slow evaporation process—generally conducted at about room temperature; and (ii) the production of asymmetrical membranes which are known to provide, at any given pore size, substantially higher flow rates and greater throughput before plugging. It would therefore be desirable to have a means for the "wet" process production of porous membranes composed of aramid resins.

DISCLOSURE OF INVENTION

It has now been found that porous, aramid membranes can be cast from emulsions of such aramid resins, utilizing a minimum of five components (including the resin component) to make up the casting dope. A homogeneous solution of the aramid resin is initially prepared by conventional procedures. For example, predetermined amounts of:

(i) an amide solvent, such as N-methyl-pyrrolidone, dimethylformamide, dimethylacetamide, or hexamethylene tetraphosphoramide, and mixtures thereof;

(ii) an inorganic solubilizing aid, such as the halides, nitrates, sulfates, and perchlorates of the alkali and alkaline earth metals, and mixtures thereof; and (iii) the aramid resin are blended together to form a homogeneous solution. Generally, the solubilizing aid will be dissolved in the amide solvent, and the aramid thereafter added to the solution. It was found that if: (a) the above, three-component system were to be immersed directly into a nonsolvent gelation bath (e.g., water) for the exchange of the solvent system into the gelation bath—the resultant membrane would be of the "hyperfiltration" type; and (b) prior to immersion into the gelation bath, a precipitant were added to the three-component system (to increase its viscosity or turbidity)—the resultant membrane would be essentially of the "ultrafiltration" type.

To provide a casting dope capable of producing coherent, microporous (i.e., mean flow pores $>0.05\mu$) membranes, two additional components are added to the basic, three-component, homogeneous solution:

(iv) a pore modifying agent—i.e., an agent which is miscible with the three-component solution over a wide concentration range, but is nevertheless a nonsolvent or poor solvent (even after interaction with the solution) of the aromatic polyamide. In general, the pore modifying agent, although a poor solvent for the polyamide, will nevertheless act as a swelling agent thereof.

A variety of such agents (or mixtures thereof) have been found suitable to act as pore modifiers, including the aliphatic alcohols or amines, and the aliphatic or alicyclic ethers; and (v) a precipitant—generally added in an amount sufficient to produce visually apparent (to the unaided eye) turbidity in the dope.

Suitable precipitants include butyl acetate, hexane, cyclohexane, methoxyethane, trichloro-trifluoroethane, and carbon tetrachloride.

At this stage, the turbid mixture may have a tendency to separate into phases if left quiescent. Therefore, if the five-component emulsion is to remain quiescent for an appreciable time prior to casting, agitation may be required to prevent such separation, immediately prior to casting into a membrane. The emulsion or dope may thereafter be employed to cast both skinless and integrally skinned membranes. The former may be prepared by the method shown in U.S. Pat. No. 4,340,479, while the latter may be prepared by the method shown in U.S. Pat. No. 4,629,563—the disclosures of which are incorporated herein by reference.

FIG. 1 is a photomicrograph of a membrane produced in accordance with the present invention. The membrane comprises skin portion 1 and support portion 2.

MODES FOR CARRYING OUT THE INVENTION

The membrane casting emulsions of the present invention can be prepared in a variety of ways. In one preferred method, the three-component system, similar to those which have previously been used for the preparation of "hyperfiltration" or reverse osmosis, aramid membranes, is initially prepared. An inorganic solubilizing aid (which, as suggested in the art, may include the halides, nitrates, sulfates, and perchlorates of the alkali and alkaline earth metals; the thiocyanates of such metals, and zinc or stannous chloride) is dissolved in an amide solvent in an amount sufficient to effect the dissolution of the aromatic polyamide—generally in an amount of 10 to 35 percent polyamide, based on the total weight of the three-component system. Of the various solubilizing aids suggested in the art, LiCl in an amount of from 2.5 to 10% (based on the weight of the three-component solution) is particularly preferred. The amide solvents will preferably consist of dimethylacetamide (DMAC), N-methyl-pyrrolidone, and dimethylformamide (DMF), but may also include dimethylsulfoxide and hexamethylene tetraphosphoramide, as well as mixtures of such solvents. As prepared, the initial, three-component, homogeneous solution should be optically clear.

Various organic solvents may be used as (iv)—the pore modifying ingredient. For example, to produce a membrane having somewhat hydrophilic properties, this fourth ingredient may be selected from the lower aliphatic alcohols (preferably those having up to five carbons in the aliphatic chain) or the aliphatic amines. On the other hand, a membrane exhibiting somewhat hydrophobic properties will generally result from the use of ether solvents; including, for example, diethyl ether, butyl ether, tetrahydrofuran, and dioxane. Other suitable solvents include, for example, methylisobutylketone, nitropropane, and methoxyethanol. An amount of this solvent will be employed, sufficient to create a metastable condition, but less than that which would produce visually apparent turbidity. The concentration range of modifier which can be employed will, of course, vary with the specific solvent (or mixtures thereof) utilized, but as a rule of thumb, will generally be within the range of 40 to 150 percent (normally 60 to 120%), by weight, of the initial three-component system prior to the addition of the modifier.

After the four-component, metastable dispersion is formed, the fifth ingredient, i.e., the precipitant, is added to bring the liquid mixture to a state of incipient phase separation, generally indicated by visual turbidity. The precipitant should be substantially miscible with the solvents already present in the metastable dispersion. Suitable precipitants include butyl acetate, aliphatic hydrocarbons such as hexane, cyclohexane, as well as trichloro-trifluoroethane, methoxyethane, carbon tetrachloride, ethylene glycol, and water. The precipitant will be added in an amount at least sufficient to create a condition of incipient phase separation, but less than that in which a moderate degree of mixing (i.e., manual stirring) would be incapable of preventing phase separation, prior to casting. Generally, the precipitant will be added in amounts ranging from 5 to 40 percent, by weight, of the four-component metastable dispersion. Desirably, immediately prior to casting, the concentration of polymer will be within the range of about 4 to 8.5 percent, preferably 5 to 7 percent, of the final casting dope.

The so-prepared casting dope can be used to prepare flat or hollow-fiber, porous membranes, having mean flow pore (mfp) sizes within the range of 0.05 to 3 microns, generally 0.1 to 0.5 microns (for skinned membrane, the mfp is that of the skin) according to conventional "wet" process phase-inversion casting techniques. For example, the turbid casting dope may be spread onto a support and either: (a) be immersed directly into a nonsolvent gelation bath, such as water; or (b) prior to such immersion, a degree of solvent removal may be achieved by vaporization for a short period of time at temperatures of the order of 70° to 130° C. The temperature of the gelation bath and the period of immersion can vary over wide limits, e.g., with bath temperatures varying from 0° to 45° C. and immersion times varying from one minute to many hours. Desirably, the temperature of the bath will be within the range of 15° to 30° C.

It should be evident that there exist many variables which affect the structure of the membrane produced in accord with this invention. The essential characteristics of the casting dope are that an aramid solution (comprising at least aramid resin, amide solvent, and solubilizing aid) be substantially diluted with a miscible, pore modifying agent and thereafter be brought to a state of incipient phase separation by the addition of a non-solvent, precipitating agent. The wide compositional range for each of the five component variables and the temperature of the dope are, of course, all significant variables. The many independent variables, together with the interactions between them, make it virtually impossible to quantify the effects of any one variable. This notwithstanding, from the many experiments performed, a number of generalizations can be made:

(a) Effect of Aramid Concentration

Both mean flow pore size and flow rate decrease as the final concentration of aramid (in the five-component dope) increases.

(b) Effect of Diluent Concentration

An increase in the amount of component (iv), the miscible, pore modifier will produce a more open membrane, i.e., larger mean flow pore size. As a consequence, changes in other variables, which will permit the addition of larger amounts of diluent, can also be employed to effect an increase in pore size. Thus, use of a stronger, amide solvent (e.g., DMAc rather than DMF) or raising the temperature of the solution permit the addition of more diluent. However, the addition of too much diluent will provide a degree of "openness" to the extent that the membrane will no longer be coherent.

On the other hand, the omission of the diluent component, or its use in amounts well below 40% of the solution, will, in either instance, produce a membrane with very fine pores.

(c) Turbidity of the Casting Dope

Increasing turbidity of the dope produces a more open membrane. Since warming the dope will tend to decrease turbidity, increases in temperature at this stage (of the five-component dope) will decrease the pore size and flow rates of the membrane.

What is claimed:

1. An integrally skinned, porous, fully aromatic polyamide membrane having a porous skin portion having a pore diameter within the range of 0.05 to 3 $\mu$ and a support portion containing pores interconnecting with the skin pores, the pores in the support portion increasing in size as their distance from the skin portion increases, such that the average diameter of the largest pores is from 10 to 300 times the diameter of the skin pores.

2. In the casting of membranes from fully aromatic polyamide resins, which method comprises preparing a casting dope by forming a solution of resin in an amount sufficient to produce a coherent membrane, casting the casting dope into a surface and precipitating the cast film by phase inversion by a quench bath, the improvement comprising forming integral skinned microporous membrane having skin pores having a mean flow diameter of from about 0.05 micrometers to about 3.0 micrometers, from a modified casting dope formed by the additional steps prior to casting of:

adding a pore modifier to the solution of resin in an amount of from about 40 to about 150 weight percent of the said casting dope and in an amount sufficient to permit casting of such microporous membrane but less than the amount which forms visually aparent turbidity in said solution, the pore modifier being an organic liquid which is essentially miscible with the solution, but is a non-solvent for the said resin, and thereafter adding a precipitant which is substantially miscible with the solvents of the said solution, in an amount sufficient to form a visably turbid dispersion which will not separate at a moderate degree of mixing.

3. The casting method of claim 2, in which the dispersion contains 5 to 8.5% polyamide, and the pore modifier is a swelling agent for the resin.

4. The casting method of claim 3, in which the pore modifier is selected from the group consisting of aliphatic alcohols or amines, aliphatic or alicyclic ethers, dioxane, methyisobutylketone, nitropropane, and methoxyethanol.

5. The casting method of claim 4, in which the precipitant is selected from the group consisting of butyl acetate, aliphatic hydrocarbons, trichloro-trifluoroethane, methoxyethane, carbon tetrachloride, ethylene glycol, and water.

6. The method of claim 2, in which the polyamide in the dispersion consists essentially of 5 to 7% aramid resin, and mean flow pore size of the cast membrane is within the range 0.1 to 0.5 microns.

7. An integrally skinned, porous, fully aromatic polyamide membrane having a porous skin portion having a pore diameter within the range of 0.05 to 3 $\mu$ and a support portion containing pores interconnecting with the skin pores produced by the process of any one of claims 2 and 3-6.

8. The membrane of claim 7, in which the emulsion consists essentially of 5-7% aramid resin.

* * * * *